United States Patent
Wesling et al.

(10) Patent No.: US 6,698,307 B2
(45) Date of Patent: Mar. 2, 2004

(54) ELECTRONIC SHIFTER FOR A BICYCLE

(75) Inventors: Kevin F. Wesling, Lombard, IL (US); Ryan A. Calilung, Chicago, IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/682,844

(22) Filed: Oct. 23, 2001

(65) Prior Publication Data

US 2003/0074997 A1 Apr. 24, 2003

(51) Int. Cl.[7] .................................................. B62M 9/00
(52) U.S. Cl. .................................. 74/473.13; 74/473.12; 280/260
(58) Field of Search ......................... 74/469, 473.12, 74/473.13; 280/260; 200/61.85

(56) References Cited

U.S. PATENT DOCUMENTS

| | | | | |
|---|---|---|---|---|
| 3,633,437 A | * | 1/1972 | Ishida | 74/489 |
| 3,999,021 A | * | 12/1976 | Delp | 200/11 DA |
| 4,065,983 A | * | 1/1978 | Mimura | 74/625 |
| 4,143,557 A | * | 3/1979 | Wakebe et al. | 474/80 |
| 4,881,187 A | | 11/1989 | Read | |
| 5,590,564 A | * | 1/1997 | Kishimoto | 74/473.13 |
| 5,967,937 A | | 10/1999 | Matsuo | |
| 6,031,190 A | * | 2/2000 | Tokuda et al. | 200/11 R |
| 6,146,297 A | | 11/2000 | Kimura | |
| 6,204,752 B1 | | 3/2001 | Kishimoto | |
| 6,213,910 B1 | * | 4/2001 | Matsuo et al. | 475/297 |
| 6,216,060 B1 | | 4/2001 | Kishimoto | |
| D442,228 S | | 5/2001 | Masui | |
| 6,227,068 B1 | | 5/2001 | Masui et al. | |
| 2002/0094906 A1 | * | 7/2002 | Jordan | 475/254 |

FOREIGN PATENT DOCUMENTS

DE 19642906 A1 4/1997

* cited by examiner

Primary Examiner—William C. Joyce
(74) Attorney, Agent, or Firm—Milan Milosevic; Lisa Wunderlich

(57) ABSTRACT

An electronic shifter for shifting a bicycle gear mechanism between a plurality of gears and using a relative shifting method. The shifter includes a stationary member mountable on a handlebar of the bicycle and a rotatable member rotatable with respect to the stationary member to define predetermined positions of the members with respect to each other. An electrical switch is operatively connected to the rotating member for generating a shift signal in response to the rotating member rotating from one predetermined position to another predetermined position.

8 Claims, 3 Drawing Sheets

ELECTRONIC SHIFTER FOR A BICYCLE

BACKGROUND OF INVENTION

This invention relates to electronic shifters for bicycles and, more particularly, to an electronic shifter using relative index shifting.

It is known in the art relating to bicycles to provide electronic shifters to actuate a gear shifter to shift a gear mechanism between gears. The system usually includes a controller or microprocessor for generating a shift signal in response to the rider manually selecting a upshift or downshift. The method of shifting may be based on absolute index shifting or relative index shifting. With absolute indexing, the shifting system has a predetermined number of gears which corresponds to an equivalent number of shift inputs that the user depresses in order to select a gear. A simple form of the electronic absolute shifter has a specific shift input button for each gear. A problem associated with such a configuration is that when one of the shift input button does not match the corresponding gear, the system does not function properly. To prevent this type of malfunction, a more complex electronic system is needed. This system requires several additional components such as a device for determining the current gear; additional computer programming to prevent miscommunication between the shift input and the actual gear; and a more costly sophisticated microprocessor to coordinate such tasks. A robust absolute shifting system requires additional complexity and costs.

In a relative indexing shifting system, each gear does not need a specific shift input rather each input represents only a generic shift. Each time the shift input is depressed the system shifts relative to the current gear. The command is not, "1 to 3 . . . 3 to 5 . . . 5 to etc., but rather a more simple command, "up . . . up . . . or down . . . down . . . , etc." This type of relative index shifting has several disadvantages. For instance, the electronic shifter may include two shift buttons, one for upshifting and the other for downshifting. This type of shifter requires the rider too rapidly push the buttons to perform multiple shifts. Another type of relative shifter is a return-to-center shifter wherein the shifter has three positions, a center, a forward twist and a reward twist. The rider twists the shifter forward or backward to shift and then the shifter returns to center under spring load. The disadvantage with this configuration is that the rider must perform twist-release, twist-release motions to perform multiple shifts. Therefore, there is a need to provide an electronic shifter that uses the simplicity of relative shifting and provides an ergonomic configuration that allows the rider to perform multiple shifts with a single movement.

SUMMARY OF INVENTION

The present invention provides an electronic shifter for shifting a bicycle gear mechanism between a plurality of gears. The shifter includes a stationary member mountable to a handlebar of the bicycle and a rotating member rotatable with respect to the stationary member to define predetermined positions of the members with respect to each other. The predetermined positions correspond to the plurality of gears. An electrical switch is operatively connected the rotating member for generating a shift signal in response to the rotating member rotating from one predetermined position to another predetermined position.

In one embodiment of the present invention, the rotating member may rotate about an axis perpendicular to the handlebar. Alternatively, the rotating member may rotate about an axis coaxial of the handlebar. The stationary member includes a first plurality of detents disposed on a surface of the stationary member. The rotating member includes a second plurality of detents disposed on a surface of the rotating member. The second plurality of detents are engagable with the first plurality of detents. The configuration of the first and second plurality of detents is such that upon rotation of the rotating member the first and second plurality of detents disengage to allow rotation of the rotating member. A resilient member biases the second plurality of detents to engage with the first plurality of detents. Rotation of the rotating member in a first direction causes the gear mechanism to be shifted in an upshift direction and a rotation of the rotating member in a second direction causes the gear mechanism to shift in an downshift direction.

These and other features and advantages of the invention will be more fully understood from the following description of certain specific embodiments of the invention take together with the accompanying drawings.

DETAILED DESCRIPTION

Figure 1:
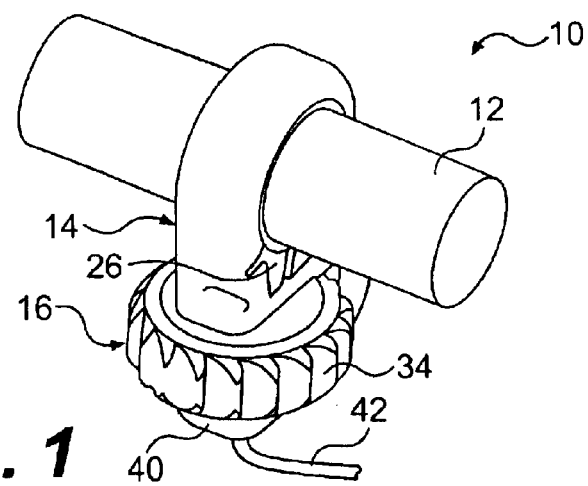
FIG. 1 is a perspective view of the present invention.
Figure 2:
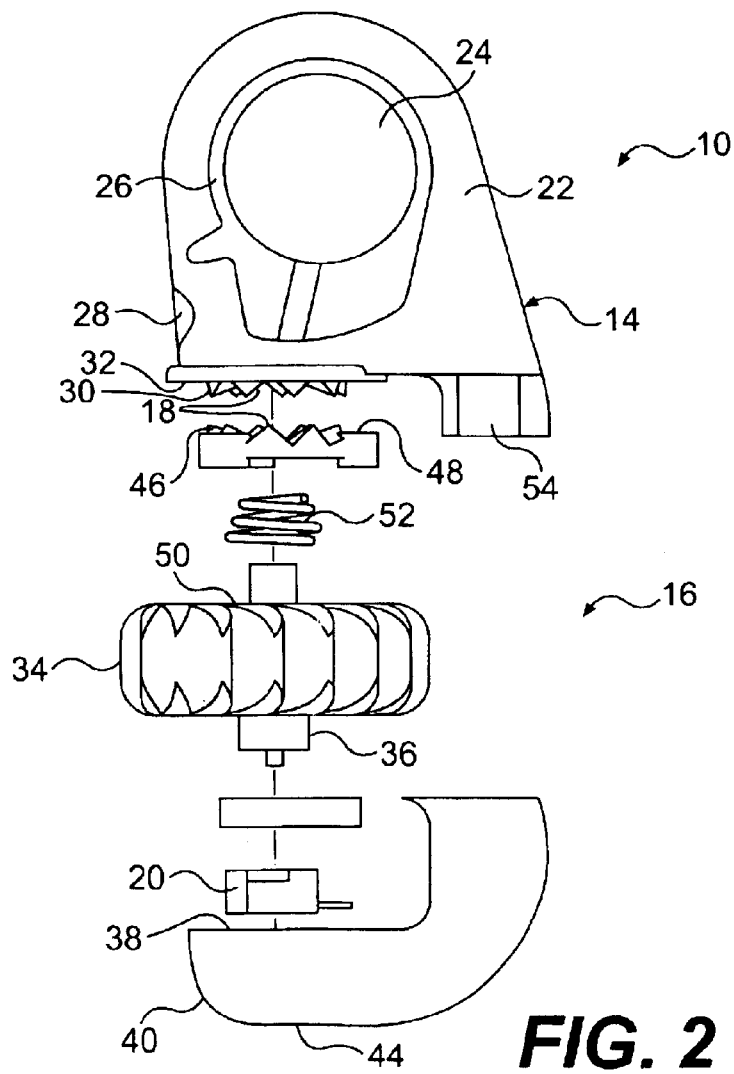
FIG. 2 is an exploded view of the present invention.

Referring to FIGS. 1 and 2 of the drawings in detail, numeral 10 generally indicates an electronic shifter mounted on a handlebar 12. The electronic shifter 10 generally includes a stationary member 14 and a rotating member 16. The rotating member 16 rotates with respect to the stationary member 14 to define predetermined positions 18 of the members 14, 16 with respect to each other. An electrical switch 20 is operatively connected to the rotating member 16 for generating a shift signal in response to the rotating member 16 rotating from one predetermined position to another predetermined position.

In one embodiment of the present invention, the stationary member 14 includes an upper housing 22 that has a central opening 24 and a clamp 26 disposed within the central opening 24. The clamp 26 fits over the handlebar 12 and mounts the upper housing 22 to the handlebar 12. A fastener or screw (not shown) extends through an opening 28 of the upper housing 22 and clamp 26 to tightly secure the stationary member 14 to the handlebar 12. The stationary member 14 also includes a first plurality of detents 30 that are disposed on an outer surface 32 of the upper housing 22.

Figure 5:
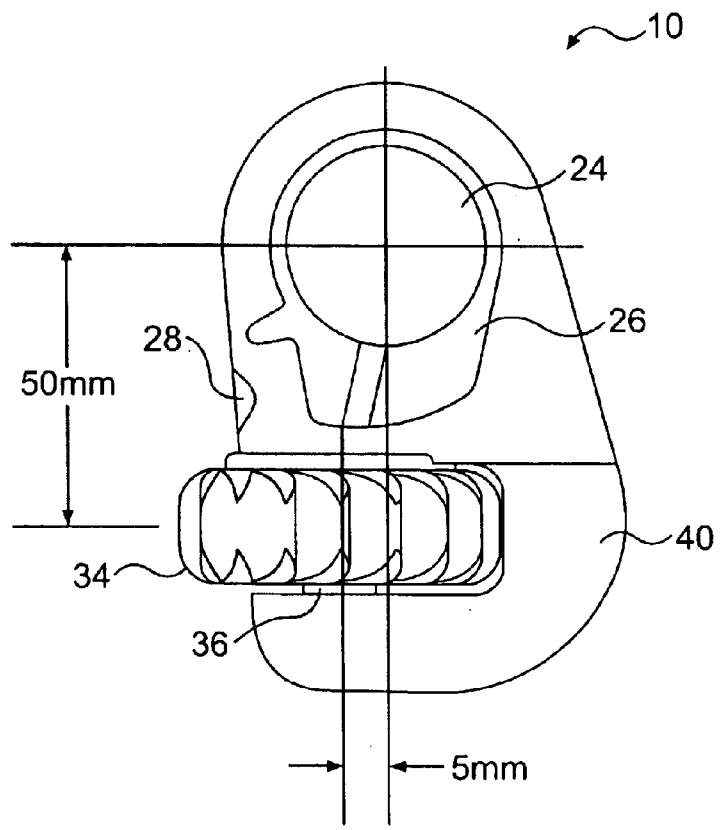
FIG. 5 is a perspective side view of the present invention.
Figure 6:
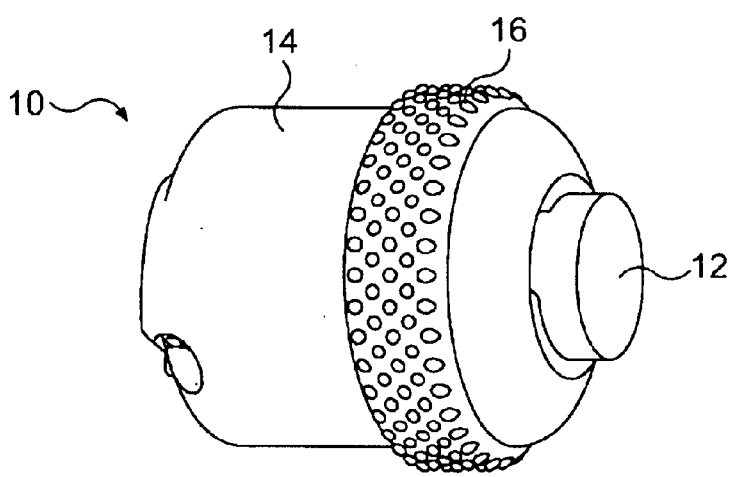
FIG. 6 is a perspective view of an alternative embodiment of the present invention.

The rotating member 16 includes a dial 34 that rotates about a shaft 36 that is operatively connected to the electrical switch 20. The dial 34 rotates about an axis that is perpendicular to the handlebar axis. In a preferred embodiment, the dial 34 rotates about an axis located 5 mm aft and perpendicular to the handlebar axis, see FIG. 5. The dial 34 is located approximately 50 mm below the horizontal plane of the handlebar. In an alternative embodiment, the rotating member 16 may rotate about an axis that is coaxial to the handlebar axis, see FIG. 6. The electrical switch 20 is disposed in a receptacle 38 of a lower housing 40 of the rotating member 16. The electrical switch 20 may be connected to a controller or microprocessor (not shown) which controls a gear shifter (not shown) through an electrical wire 42 that extends through an opening 44 in the lower housing 40. In response to the controller receiving a signal from the electrical switch, the controller actuates the gear shifter to shift the gear mechanism to the selected gear. Alternatively, the wire 42 may be directly connected to the gear shifter.

Figure 3:
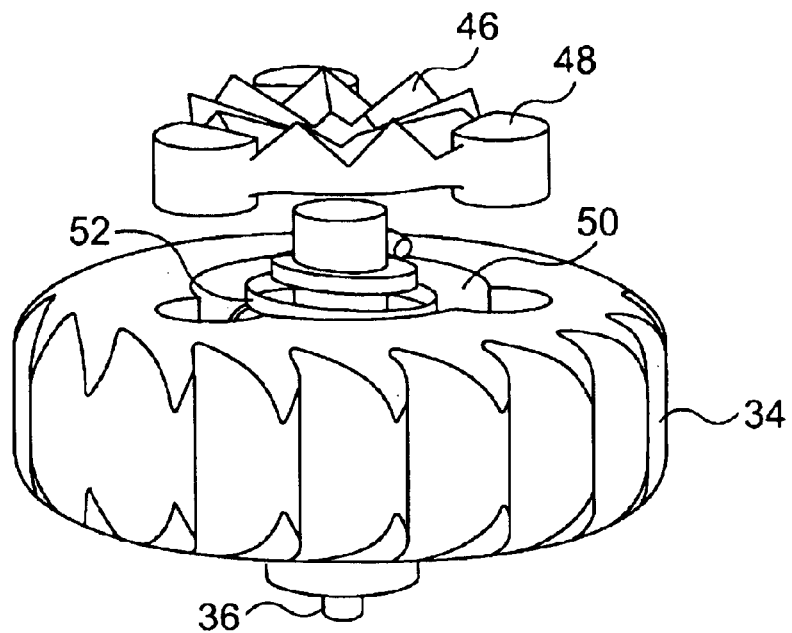
FIG. 3 is a perspective view of the rotating member of the electronic shifter of FIGS. 1–2.
Figure 4:
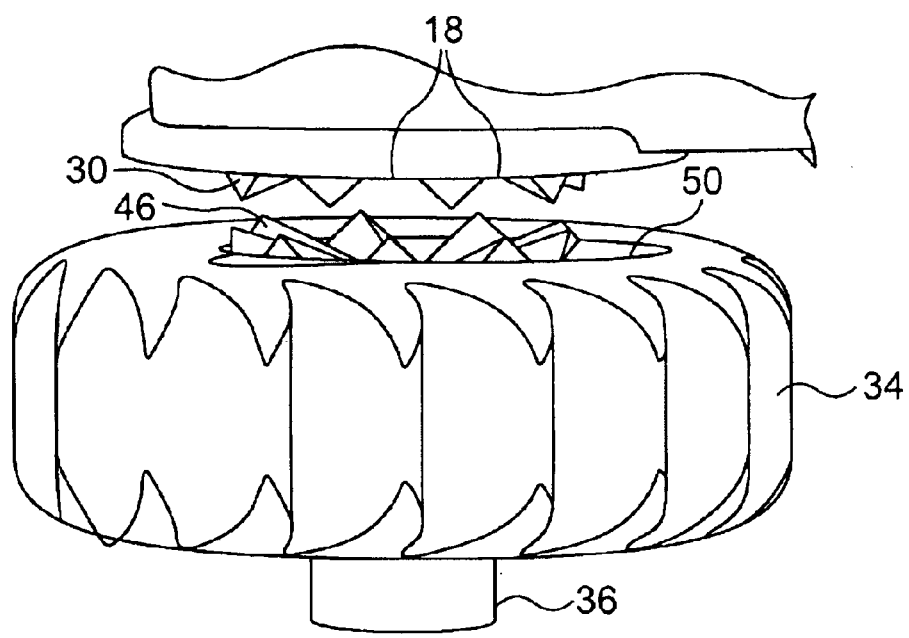
FIG. 4 is a perspective view of the first and second plurality of detents of the electronic shifter of FIGS. 1–2.

The rotating member 16 includes a second plurality of detents 46 that are located on an outer surface 48 of the rotating member 16. The second plurality of detents 46 are engaged with the first plurality of detents 30 of the stationary member 14 to define the predetermined positions 18 of the members 14, 16 with respect to each other. Each predetermined position 18 corresponds with a gear position of the gear mechanism. In one embodiment, the second plurality of detents 46 may be a separate element disposed in a cavity 50 of the dial 34 and is rotatable with the dial 34, see FIGS. 3 and 4. A resilient member or compression spring 52 is located between the second plurality of detents 46 and the dial 34. The compression spring 52 biases the second plurality of detents 46 towards the first plurality of detents 30. When the dial 34 is rotated by the rider, the second plurality of detents 46 disengages from the first plurality of detents 30 under the pressure of the rotational force of the dial 34. The stationary and rotating member 14, 16 are connected together by a fastener or screw (not shown) that extends through an opening 54 extending therebetween.

While this invention has been described by reference to a preferred embodiment, it should be understood that numerous changes could be made with the spirit and scope of the inventive concepts described. Accordingly, it is intended that the invention not be limited to the disclosed embodiment, but that it have the full scope permitted by the language of the following claims.

What is claimed is:

1. An electronic shifter for shifting a bicycle gear mechanism between a plurality of gears, comprising:

a stationary member including a first plurality of detents mountable to a handlebar;

a rotating member including a second plurality of detents engageable with said first plurality of detents to define predetermined positions of said members with respect to each other, said predetermined positions corresponding to said gears of the gear mechanism; and an electrical switch operatively connected to the rotating member wherein the electrical switch generates a first shift signal in response to the rotation of the rotating member through a plurality of gears in a first direction and a second shift signal in response to the rotation of the rotating member through a plurality of gears in a second direction.

2. An electronic shifter as in claim 1 wherein the rotating member rotates about an axis perpendicular to the handlebar.

3. An electronic shifter as in claim 1 the first plurality of detents and the second plurality of detents have a configuration such that upon rotation of the rotating member the first and second plurality of detents disengage to allow rotation of the rotating member.

4. An electronic shifter as in claim 3 further comprising a resilient member for biasing the second plurality of detents to engaged with the first plurality of detents.

5. An electronic shifter as in claim 1 wherein a rotation of the rotating member in a first direction causing the gear mechanism to be shifted in an upshift direction and a rotation of the rotating member in a second direction causing the gear mechanism to be shifted to a downshift direction.

6. An electronic shifter as in claim 1 wherein the stationary member includes:

a housing having a central opening and an outer surface having the first plurality of detents; and a clamp disposed in the central opening, the clamp fitted over the handlebar to secure the stationary member to the handlebar.

7. An electronic shifter as in claim 1 wherein the rotatable member includes:

a housing having a receptacle for receiving the electrical switch;

a shaft rotatable about an axis perpendicular to the handlebar and operatively connected to the electrical switch;

a dial rotatable about the shaft having a cavity;

an engaging element disposed in the cavity and having an outer surface having the second plurality of detents; and a resilient member disposed between the engaging member and the dial for biasing the second plurality of detents towards the first plurality of detents.

8. An electronic shifter as in claim 1 wherein the rotating member rotates about an axis coaxial with the handlebar.

* * * * *